March 13, 1934.  W. L. STANSBURY  1,950,865
DENTAL CROWN GAUGE
Filed Jan. 5, 1933    3 Sheets-Sheet 1

Inventor
W. L. Stansbury
By Clarence A O'Brien
Attorney

March 13, 1934.   W. L. STANSBURY   1,950,865
DENTAL CROWN GAUGE
Filed Jan. 5, 1933   3 Sheets-Sheet 2
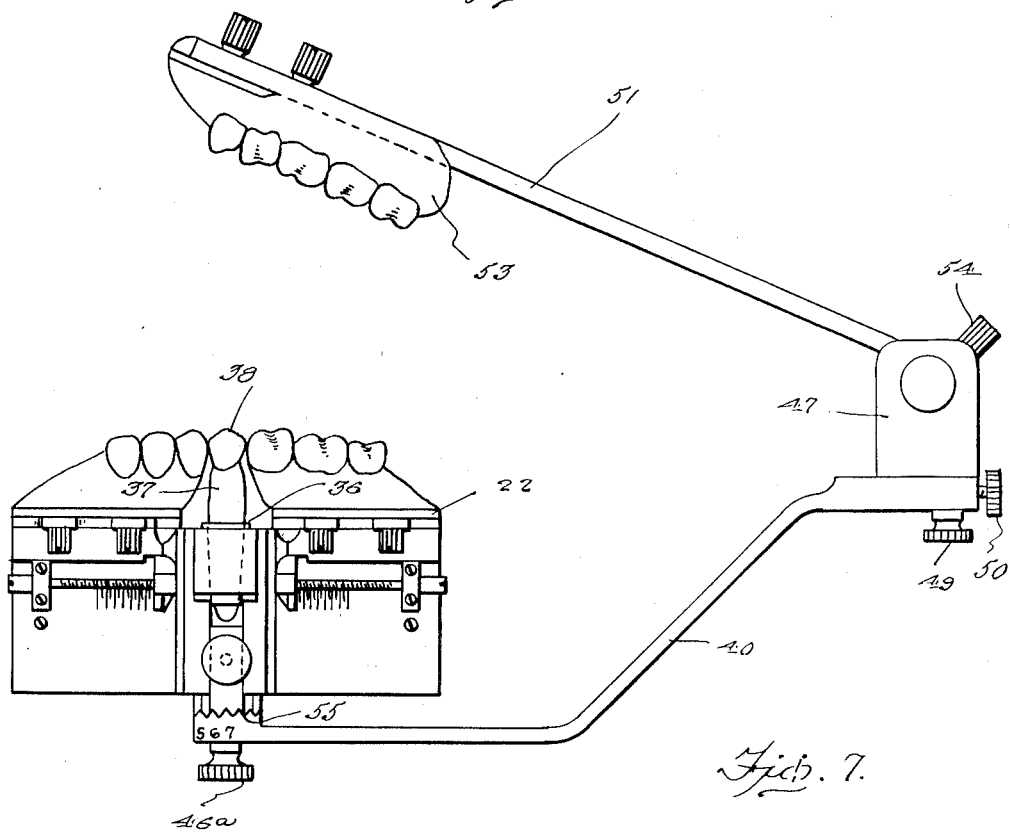
Fig. 2.
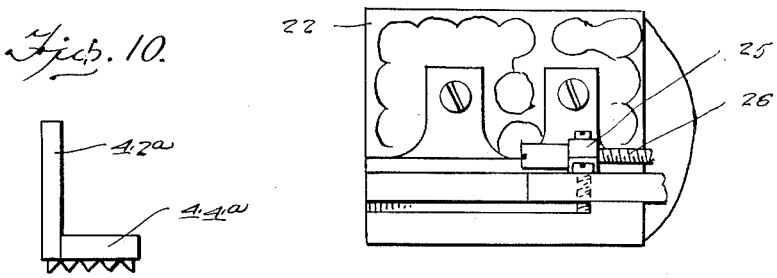
Fig. 10.
Fig. 7.
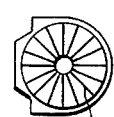
Fig. 11.
Inventor
W. L. Stansbury
By Clarence A. O'Brien
Attorney March 13, 1934.  W. L. STANSBURY  1,950,865
DENTAL CROWN GAUGE
Filed Jan. 5, 1933  3 Sheets-Sheet 3

Inventor
W. L. Stansbury

By Clarence A. O'Brien
Attorney

Patented Mar. 13, 1934

1,950,865

UNITED STATES PATENT OFFICE 1,950,865

DENTAL CROWN GAUGE

William L. Stansbury, Mountain View, Calif.

Application January 5, 1933, Serial No. 650,314

4 Claims. (Cl. 32—1)

This invention relates to a gauge provided for the accurate holding and fitting of dental crowns and inlays, and is an improvement over the gauge forming the subject matter of my copending application Serial No. 635,080 filed September 27, 1932.

The invention together with its numerous objects and advantages will be best understood from a study of the following description, taken in connection with the accompanying drawings wherein:

Figure 2 is a front elevational view of a slightly modified form of gauge.

Figure 6 is a sectional elevational view illustrating certain details of construction to be hereinafter more fully referred to.

Figure 7 is a plan view of a slidable model carrying plate.

Figure 10 is a side elevational view of a slide member forming part of the embodiment of the invention shown in Figure 2, and Figure 11 is a bottom plan view of the slide member shown in Figure 10.

Figure 1:
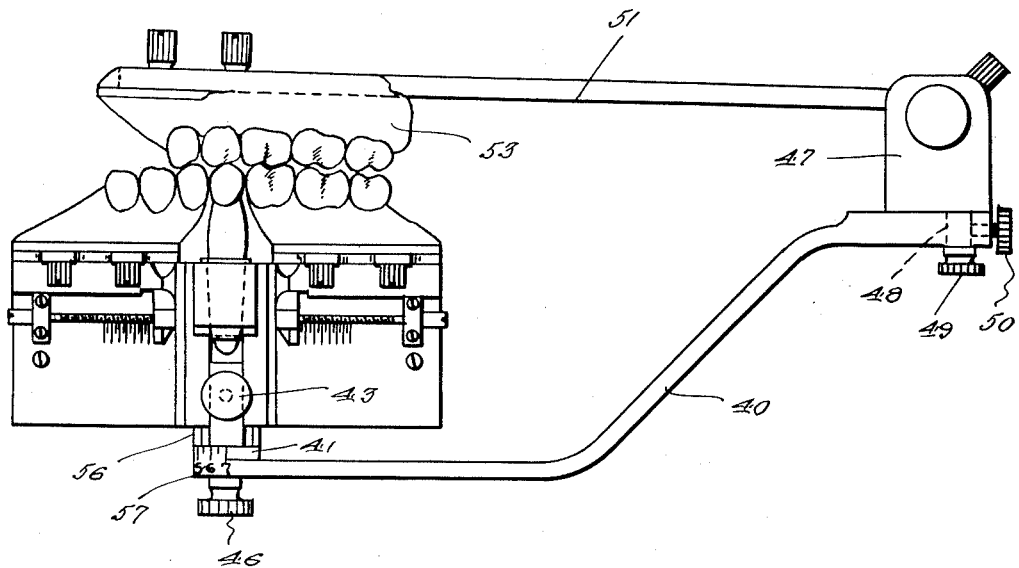
Figure 1 is a front elevational view of one form of gauge embodying the features of the present invention.
Figure 6:
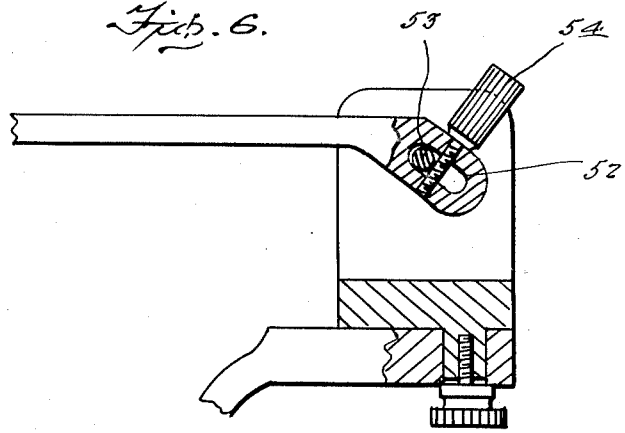
Figure 9:
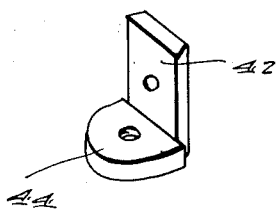
Figure 9 is a perspective view of a slide member forming part of the invention.
Figure 8:
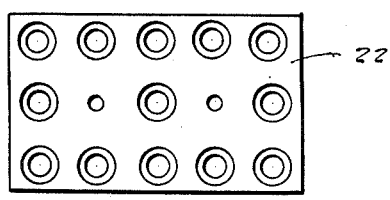
Figure 8 is a plan view of a perforated plate embodying the features of the present invention.

Referring to the drawings by reference numerals it will be seen that 10 indicates an oblong plate of wood or any other suitable material provided on its front side with a channeled block like formation 11 provided with a channel or mortise 12 closed at its upper end through the medium of a cross bar 13 secured in position by suitable fastening elements 14.

On the rear face thereof the block 10 is provided with a longitudinal mortise tongue 15; and adjustably associated with the plate 10 is a pair of sliding plates 16, 17. Each of the plates 16, 17 includes a flange portion 18 provided with a mortise groove 19 receiving the mortise tongue 15.

Figure 5:
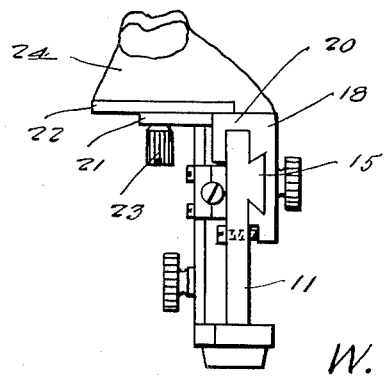
Figure 5 is an end elevational view of the structure shown in Figure 3.

Each of the plates 16, 17 also includes a channel part 20 disposed at right angles to the flange 18 together with apertured tongue like parts 21 extending forwardly from the channel part 20. Channel part 20 engages the upper edge of the block 10 in the manner clearly shown in Figure 5; while secured to the parts 21 is a perforated metallic plate 22, screws 23 being provided and engageable with the parts 21 and the plate 22 for securing the later in position. Suitably associated with the perforated plate 22 is the section 24 of a dental model.

Figure 3:
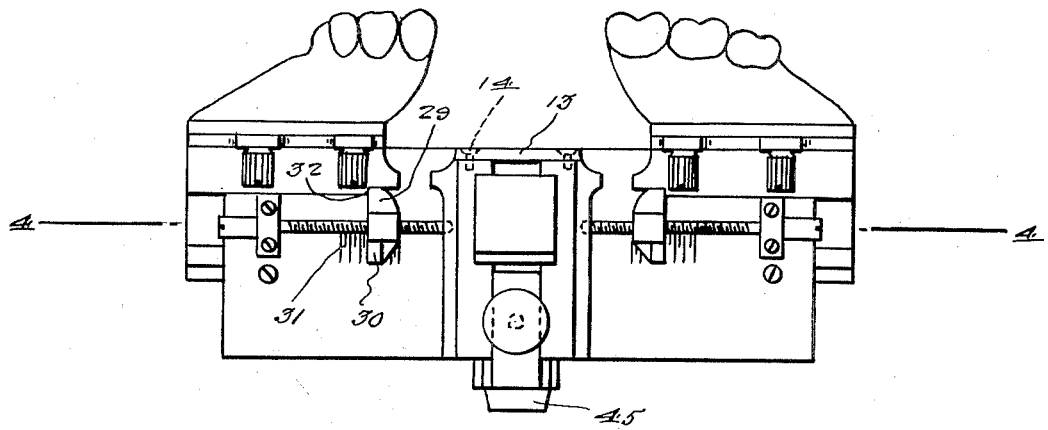
Figure 3 is a front elevational view of the gauge, certain parts being removed.

For minutely adjusting the plates 16, 17 there are provided on the front sides of the plate 10 bearing blocks 25 within which are journalled the non-threaded head equipped ends of adjusting screws 26. The free ends of the screws 26 are journaled in sockets 27 provided on opposite side edges of the formation 11. Threadedly engaged with the screws 26 are combination stops and indexes 28, and as will be clear from a study of Figures 3 and 4 each of the indexes 28 includes an intermediate bored portion threadedly receiving a screw 26 and end portions 29, 30; the end portion 29 constituting a stop and the end portion 30 constituting an index adapted to be read against a scale 31 provided on the front face of the block 10. As shown in Figure 3 the channel portions 20 of the plates 16, 17 at one end are notched as at 32 for engagement with the end 29 of a member 28 for limiting sliding movement of the plate inwardly toward the transverse center of the block 10.

A ferrule or holder designated generally by the reference character 33 comprises a body or block like portion 33a arranged for sliding engagement with the mortise groove 12. Engaged with the plate 10 and the member 33a is an adjusting screw 34 that is adapted to bite into the block like portion 33a for securing the holder or ferrule 33 at the desired adjustment.

Figure 4:
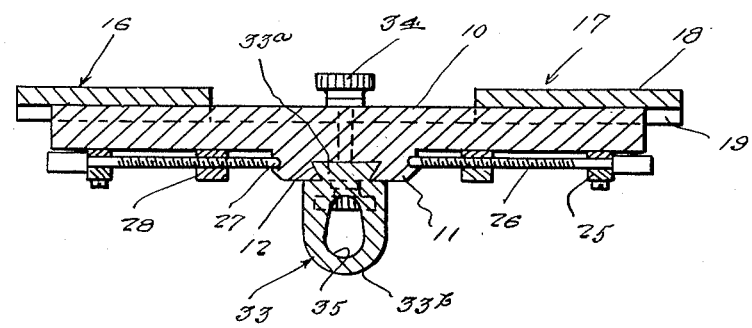
Figure 4 is a sectional view taken substantially on the line 4—4 of Figure 3.

The holder 33 also includes a part 33b that has a tapered opening 35 therethrough, and the opening 35 is substantially oval or otherwise shaped in cross section so that model 37 will always retain its identical position as will be clear from a study of Figure 4. For the opening 35 there is provided a sleeve like lining 36 of metal or other suitable materal and the sleeve 36 is adapted to be packed with plaster of Paris or other plastic material. A tooth model 37 is adapted to be forced through the plastic material arranged in the sleeve 36, and in this manner the model 37 may be readily adjusted vertically.

The invention as above described is somewhat similar to that embodying the subject matter of my hereinbefore identified application for patent, the present invention differing from that of the referred to application substantially only in the specific means for securing the plates 16, 17 at the desired adjustment.

In using the invention as above described a model is first provided, the same being a replica of the patient's jaw, in the present instance, the lower jaw, after which the model is divided into sections and the sections herein designated by the reference numeral 24 are applied to the plates 22 which in turn are secured to the plates 16, 17 in a manner hereinbefore stated. The plates 16, 17 are then adjusted relative to one another to position the teeth on the confronting ends of the model sections 25 the proper distance apart. The distance separating said teeth will of course depend upon the relative position of the teeth of the patient. The model 37 is formed of plaster of Paris or the like and is a replica of the tooth to be treated. This model is placed in the holder 33 after which the holder is properly adjusted vertically to dispose the lower end of the model 37 in proper position between the teeth of the sections 24 in a manner suggested in, for example, Figure 1. The crown to be placed on the patient's tooth is then fashioned on the upper end of the model 37 and when completed, the crown designated generally by the reference character 38 will be of the proper size and can be readily fitted to the tooth of the patient.

The present invention is especially concerned with the provision of means supporting a third dental model, the latter being a model of a portion of the upper and lower jaws of the patient in an operative position relative to the model sections 24 and the model 37. Thus it will be seen, that in the form of the invention as shown in Figure 1 there is provided an angular supporting arm 40 that is provided at one end with a socket 41. A slide plate 42 is adapted to slidably engage a mortise 12 and to be secured in position through the medium of a screw 43. On the lower end thereof the member 42 is provided with a lateral projection 44 that is formed on its under side in a manner to provide a tapered pin 45 adapted to engage the socket 41. A screw 46 passes upwardly through the socket 41 and has screw threaded engagement with the projection 44 for securing the arm 40 at the desired angular adjustment. The free end of the bracket 40 has detachably mounted thereon a substantially U-shaped member 47 which is provided at the bottom thereof with a pin 48 extending through an aperture provided in said free end of the bracket 40. The said pin is provided with a threaded opening with which is engaged a screw 49 that is adapted to bear against the underside of the bracket 40. A second screw 50 is disposed at right angles to the screw 49 and is threadedly engaged with the bracket 40 to bight into the pin 40 so that suitable means is provided for locking the U-shaped member 47 at the desired angular adjustment.

Supporting arm 51 has an offset slotted end 52 arranged between the sides of the U-shaped member 47 and engaged with the sides of said U-shaped member and extending through the slot in the end 52 of arm 51 is a screw 53 that serves to draw the sides of the U-shaped member 47 into frictional engagement with end 52 of arm 51 for securing the latter at the desired angular adjustment. Also engaged with the slotted end 52 of arm 51 is a screw 54 and through the medium of the screw 54 the arm 51 may be held in either of two longitudinally adjusting positions relative to the plate 10; it being understood that when the arm 51 is so positioned that the bolt 53 is disposed at the upper end of the slot in end 52 of said arm, arm 51 is in position for supporting the model 55 carried thereby in position relative to the models 24 for posterior articulation. When the arm 51 is so adjusted that the screw 53 is arranged in the lower end of the slot in end 52 of arm 51 then the model 53 carried by the arm 51 will be in a position relative to the models 24 for anterior articulation.

The form of the invention shown in Figure 2 differs from that shown in Figure 1 in that instead of having a pin and socket connection between the part 44 and the bracket 40 there is provided a ratchet means for securing the bracket 40 at the desired angular adjustment; thus referring to Figures 2, 10 and 11 it will be seen that slide 42 is provided with the lateral projection 44a which on its under side is provided with a circular series of ratchet teeth 54. The bracket 40 at that end thereof engaged with the projection 44a is also provided with a circular series of ratchet teeth 55 for engagement with the teeth 54 and a screw 46a corresponding to the screw 46 is engaged with the bracket 40 and the projection 44a in the manner clearly suggested in Figure 2 for securing the teeth 54 and 55 interengaged.

It is also to be noted, that in each of the forms of the invention shown in Figures 1 and 2, the lateral projections are provided with relatively spaced index lines 56 adapted to be read against a scale 57 carried by the bracket 40 and thus an accurate adjustment of the bracket may be readily ascertained. After an adjustment of the bracket 40 has been made and ascertained by reference to the index 56 and scale 57 the models 24, 37 and 53 may be suitably marked, so that upon subsequent use thereof the necessary adjustments being known, such adjustments can be readily effected.

Even though I have herein shown and described the preferred embodiment of the invention, it is to be understood that the same is susceptible of further changes, modifications and improvements coming within the scope of the appended claims.

Having thus described my invention, what I claim as new is:

1. A device for use in building and fitting dental crowns and inlays comprising a base plate, model carrying plates on the base plate and arranged to shift longitudinally thereof relative to one another, means on the model carrying plates for securing sections of a dental model thereto, adjusting screws rotatably mounted on the base plate, combination stops and indexes having threaded engagement with said screws, and means on the model carrying plates engageable with said combination stops and indexes for limiting movement of said model carrying plates inwardly toward one another, together with scales on said base plate against which said combination stops and indexes are adapted to be read in adjusting the model carrying plates.

2. A device for use in building and fitting dental crowns and inlays comprising a base plate, model carrying plates on the base plate and arranged to shift longitudinally thereof relative to one another, means on the model carrying plates for securing sections of a dental model thereto, adjusting screws rotatably mounted on the base plate, combination stops and indexes having threaded engagement with said screws, and means on the model carrying plates engageable with said combination stop and indexes for limiting movement of said model carrying plates inwardly toward one another, together with scales on said base plate against which said combination stops and indexes are adapted to be read in adjusting the model carrying plates, and a holder slidably mounted on the base plate for movement at right angles to the plane of travel of said model carrying plates, said holder being provided with means for securing a tooth model in operative position to the aforementioned dental model sections.

3. A device for use in building and fitting dental crowns and inlays comprising a base plate, model carrying plates on the base plate and arranged to shift longitudinally thereof relative to one another, means on the model carrying plates for securing sections of a dental model thereto, adjusting screws rotatably mounted on the base plate, combination stops and indexes having threaded engagement with said screws, and means on the model carrying plates engageable with said combination stops and indexes for limiting movement of said model carrying plates inwardly toward one another, together with scales on said base plate against which said combination stops and indexes are adapted to be read in adjusting the model carrying plates, and a holder slidably mounted on the base plate for movement at right angles to the plane of travel of said model carrying plates, said holder being provided with means for securing a tooth model in operative position to the aforementioned dental model sections, a bracket extending from said base plate, and an arm adjustably connected at one end with said bracket, and a dental model carried by said arm for operative position relative to the said dental model sections.

4. A device for use in building and fitting dental crowns and inlays comprising a base plate, model carrying plates on the base plate and arranged to shift longitudinally thereof relative to one another, means on the model carrying plates for securing sections of a dental model thereto, adjusting screws rotatably mounted on the base plate, combination stops and indexes having threaded engagement with said screws, and means on the model carrying plates engageable with said combination stops and indexes for limiting movement of said model carrying plates inwardly toward one another, together with scales on said base plate against which said combination stops and indexes are adapted to be read in adjusting the model carrying plates, and a holder slidably mounted on the base plate for movement at right angles to the plane of travel of said model carrying plates, said holder being provided with means for securing a tooth model in operative position to the aforementioned dental model sections, a bracket extending from said base plate, and an arm adjustably connected at one end with said bracket, and a dental model carried by said arm for operative position relative to the said dental model sections, and means pivotally connected with said bracket and having sliding engagement with the base plate in line with said tooth model holder.

WILLIAM L. STANSBURY.